United States Patent [19]

Goertler et al.

[11] 4,336,482
[45] Jun. 22, 1982

[54] REAR WINDOW WIPER MOTOR CONTROL

[75] Inventors: Horst Goertler, Sachsenheim; Joachim Munz, Gemmrigheim; Hans Prohaska; Horst Rachner, both of Bietigheim-Bissingen, all of Fed. Rep. of Germany

[73] Assignee: ITT Industries, Inc., New York, N.Y.

[21] Appl. No.: 97,848

[22] Filed: Nov. 27, 1979

[30] Foreign Application Priority Data

Nov. 30, 1978 [DE] Fed. Rep. of Germany ....... 2851770

[51] Int. Cl.³ ............................................. H02P 1/04
[52] U.S. Cl. .................................... 318/443; 318/256; 318/261; 318/280; 318/281; 15/250.12
[58] Field of Search ........... 15/250.12, 250.02, 250.13, 15/250.14, 250.17; 318/443, 446, 256, 261, 280, 281, 282, 284, 444, 257, 258, 282

[56] References Cited

U.S. PATENT DOCUMENTS 3,564,375  2/1971  Allaria .................... 15/250.12 X
3,675,103  7/1972  Elliott ..................... 15/250.12 X
3,774,091  11/1973  Kearns ..................... 318/443 X Primary Examiner—Ulysses Weldon
Attorney, Agent, or Firm—James B. Raden; William J. Michaels

[57] ABSTRACT

A windshield wiper system having an electric motor for driving windshield wipers through repeating wiper cycles by reversing the direction of rotation of the motor through a reversing switch comprising a pair of relays which control the polarity of current applied to the motor. A limit switch is mechanically coupled to the motor for detecting the end positions of the motor and for providing signals indicative thereof. First and second time delay circuits each have an output respectively coupled to one of the relays, and each delay circuit has a pair of inputs coupled to the limit switch. Each delay circuit is activated to provide a delayed output to its relay by a respective end position signal which immediately deactivates the other delay circuit.

1 Claim, 4 Drawing Figures

REAR WINDOW WIPER MOTOR CONTROL

BACKGROUND OF THE INVENTION

The invention starts from a circuit arrangement with the features of the prior art and provides an improvement thereover.

In known circuit arrangements for a wiper motor which is reversible with respect to the direction of rotation the reversing switch is directly changed over by a switching cam driven by the motor. Thereby the changeover speed is dependent on the number of revolutions of the wiper motor which in practice varies considerably. Thereby the contacts of the reversing switch are especially heavily loaded, when the changeover process is carried out slowly.

A further disadvantage is the heavy current load, when the motor is reversed during operation. Because of these grounds the known circuit arrangements did not reach the prescribed number of switching operations.

The invention is based on the problem to create a circuit arrangement of the above mentioned type with means as simple as possible and oriented to the future and functioning without trouble after a longer time of operation, too.

This problem is solved with the characterising features of the invention.

SUMMARY OF THE INVENTION

Thereby it is essential that the reversing switch carrying the motor current is no longer directly controlled by a motor driven switching cam, but that a limit switch loaded with only a low control current controls the switching relays of the reversing switch. The switching time of the two changeover bridging contacts of the reversing switch is thereby substantially reduced and no longer depends on the number of revolutions of the motor.

The development according to the invention is of considerable importance, because the current load of the contacts of the changeover relays is reduced thereby. It is ensured that the wiper motor is connected to the voltage source only when it is idle.

By the measure according to the invention the operating safety of the system is increased, for the changeover relays are reliably switched off, even if the evaluation circuit has a defect.

The evaluation circuit via which the changeover relays are controlled with delay in time can be built up with concrete building blocks, but in new developments solutions with a micro-computer will be preferred, by which further functions can be controlled without additional means. Above all this refers to the kind of switching off of the system according to the invention as well as to the control of a washer installation according to the invention. Besides the method of operation of different wiper installations, e.g. the windscreen and rear window wiper installation, can be very simply synchronised. However it can as well be imagined to drive the two wipers for the windscreen via a separate motor each and to energise these two motors via the microcomputers. Finally a system which can be universally used can be created in that according to the invention the microcomputer can realize different program flows which are selectable by a correspondingly coded input signal.

BRIEF DESCRIPTION OF THE DRAWING

The invention is described below by way of the embodiments shown in the accompanying drawings, in which.

DETAILED DESCRIPTION

Figure 1:
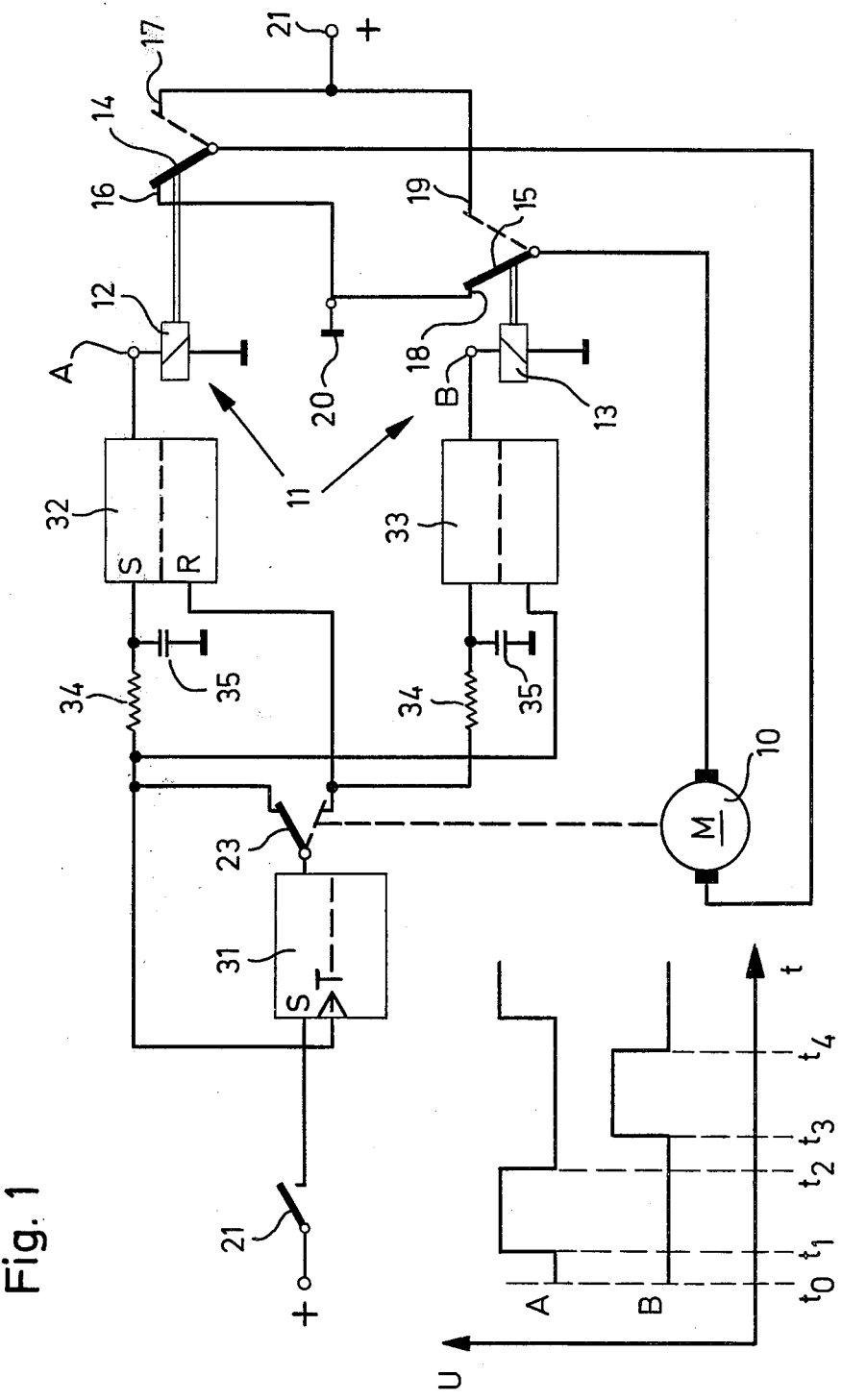
FIG. 1 is a schematic circuit diagram for a rear window wiper system.

In FIG. 1 a rear window wiper motor connected to a reversing switch 11 is designated by 10. The reversing switch consists of two relays 12, 13 with changeover bridging contacts 14 and 15 co-operating with the stationary contacts 16, 17 and 18, 19. The stationary contacts 16, 18 are connected to earth 20, the stationary contact 17, 19 to the positive terminal 21 of a voltage source not shown in the drawing.

In the rest position shown in FIG. 1 the motor 10 is short-circuited.

The evaluation circuit 30 has three building blocks 31 to 33 operating as flip-flop and responding to a positive slope. A time-delay element with the resistor 34 and the capacitor 35 each is series connected to the set inputs S of the building blocks 32, 33. The set input S of the building block 31 is controlled by the operating switch 21. In the end position a limit switch 22 with a changeover contact 23 is actuated by the motor 10. In the one end position the changeover contact 23 via a time-delay element connects the output of the building block 31 with the set input S of the building block 32 and with the reset input R of the building block 33 and with the trigger input T of the building block 31. In the other end position the set input S of the building block 33 and the reset input R of the building block 32 is energised via a time-delay element.

FIG. 1 thus shows clearly that the changeover bridging contacts carrying the motor current are controllable by the evaluation circuit independently of each other and that the limit switch only has to switch a control current for the evaluation circuit. The system functions as follows:

The operating switch 21 is actuated at the time $t_0$ and thereby the flip-flop 31 is set. As long as the operating switch is closed the trigger signals on the trigger input T remain ineffective. The flip-flop 32 is set with delay by the positive slope on the output of the flip-flop 31, whereby the output A of said flip-flop 32 is carrying voltage at the time $t_1$. The changeover relay 12 responds and changes over the changeover bridging contact 14 to the stationary contact 17 applied to the positive terminal. The motor starts in a particular direction of rotation.

In the other end position the changeover contact 23 is changed over into the dotted position by the motor 10 at the time $t_2$. Thus the flip-flop 32 is immediately reset and the motor 10 is braked by short circuit. Besides the flip-flop 33, the output B of which carries voltage at the time $t_3$, is set with delay via the timing element. Thus the changeover relay 13 responds at the time $t_3$ and the motor is energised now in reverse direction. At the time $t_4$ the motor again reaches its first end position which at the same time can be designated as parking position. The changeover contact 23 again occupies the position shown in the drawing, the flip-flop 33 is reset immediately, the motor thus dynamically braked, but the flip-flop 32 is only set with delay.

From this description and the diagram of FIG. 1 thus it is clearly to be seen that the two changeover relays 12, 13 are energised with delay in time in a way that the motor is only applied to voltage anew after its standstill. Thereby the contact load of the reversing switch is essentially reduced.

As long as the operating switch 21 is actuated the operation is continued as described. If the operating switch is switched off the condition of the flip-flop 31 remains unchanged at first. The motor 10 continues to rotate in the respective direction of rotation. Only if the limit switch again occupies the position shown in the drawing together with the resetting of the flip-flop 33 a signal is conducted to the trigger input T of the flip-flop 31 too, which also resets this building block. Then the flip-flop 32 can no longer be set and the changeover relays 12, 13 remain dead both. The system is switched off.

Thus the evaluation circuit interrogates the switching condition of the operating switch and takes care that also after the operating switch is switched off the motor 10 continues running until it reaches one end position, in the example shown its parking position.

Alternatively the circuit arrangement could be developed in a way that the motor would be stopped in the following end position. This could be achieved in that the trigger input of the flip-flop 31 would be connected with both outputs of the limit switch via an OR-gate.

Alternatively the circuit arrangement could be developed in a way too that upon switching off the operating switch of the motor which is necessary to enter the parking position is determined. The motor therefore would be immediately reversed. This could be achieved in that upon switching off of the operating switch independently of the momentary switching condition of the flip-flops 31, 32 the flip-flop 32 is reset and the flip-flop 33 is set with delay.

A disadvantage of the embodiment according to FIG. 1 is that, when one of the building blocks of the evaluation circuit is defect, the relay could continuously remain energised. Then the motor would not be switched off in the end position. The wiper installation would then be destructed.

Figure 2:
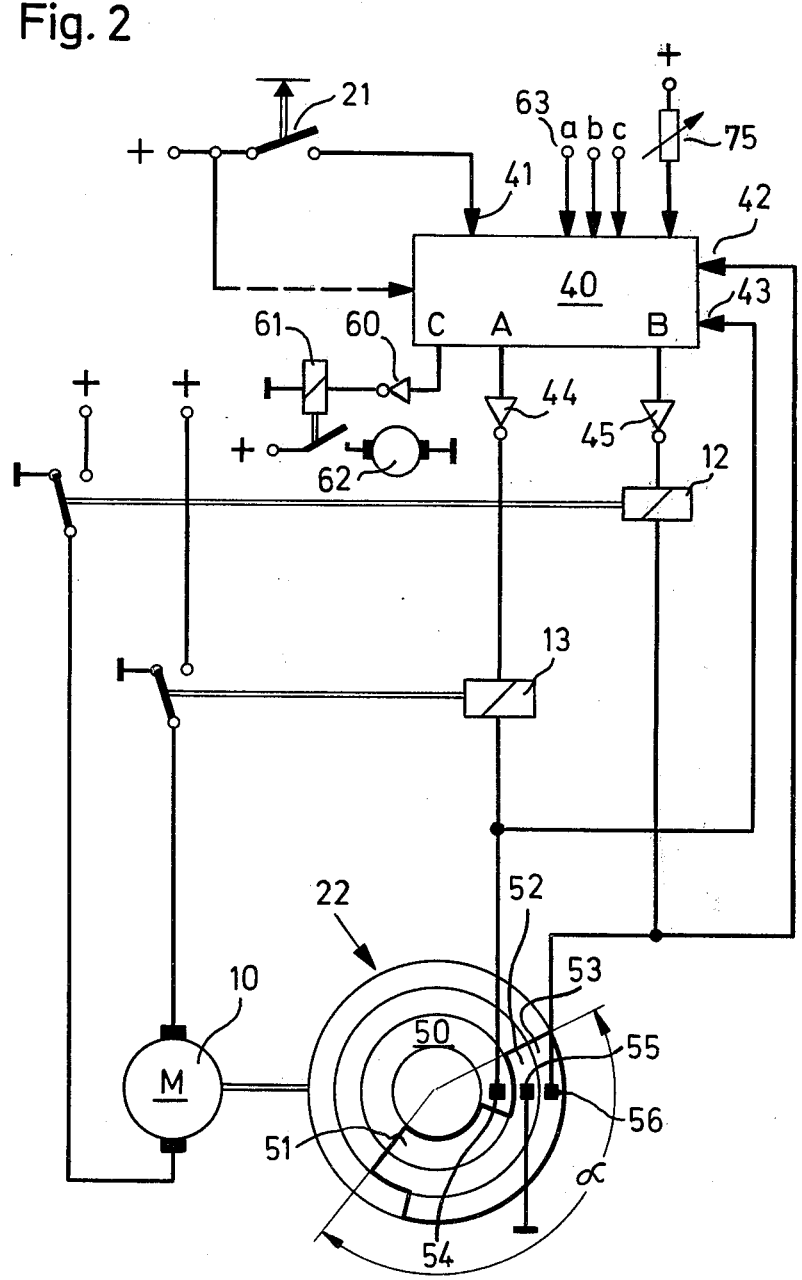
FIG. 2 is a schematic circuit diagram of an embodiment with increased switching safety.

In the embodiment according to FIG. 2 this shortcoming is eliminated. In this embodiment a microcomputer 40 is provided as evaluation circuit, said microcomputer having a control input 41 for the operating switch 21 and two control inputs 42 and 43 for the limit switch 22. The two changeover relays 12 and 13 are connected to the outputs A and B of the microcomputer 40 via power stages 44, 45 on which the pulse sequence shown in FIG. 1 may be measured.

The limit switch 22 actuated by the motor 10 has a switching disk 50 with three contact paths 51, 52, 53 on which contact spring 54, 55, 56 are sliding. In the one end position shown the control input 42 of the microcomputer and the changeover relay 12 are connected to earth via the contact springs 55, 56 and the contact paths 52, 53. The circuit for the other changeover relay 13 is interrupted. In the other end position, the switching disk turns by the angle α, the circuit for the changeover relay 13 is closed via the contact springs 54, 55 and the contact paths 51, 52, but the circuit for the changeover relay 12 is interrupted. In the meantime the circuits of both changeover relays are closed and both control inputs 42, 43 of the microcomputer are connected to earth.

Thus the limit switch is developed as special changeover switch and looped into the circuits of the changeover relays. Thereby it is ensured that the changeover relays can be de-energised too, when the microcomputer is defect. The function of the circuit arrangement corresponds to that according to FIG. 1, whereby the microcomputer evaluates negative slopes on the control inputs 42, 43.

The microcomputer has a further output C which actuates a further relay 61 via an amplifier 60. Via said relay a washing pump motor 62 is energised. Thereby the microcomputer can realize different program flows. For instance it can provide that only a short washing pulse per wiping cycle is released. The program can also be developed in such a way that a washing pulse can be measured on the output C each time the limit switch is changed over. Besides, when the operating switch is switched off, the program of the microcomputer can provide that a certain number of wiping cycles is still carried out and the pane to be cleaned is wiped dry. Thereby various developments can be imagined. It is very advantageous to preprogram all imaginable alternatives of program flows and to equip the microcomputer with further control inputs 63a, b, c via which a particular program flow may be selected. Then the microcomputer can be universally used and be energised by the customer according to the desired program flow.

Figure 3:
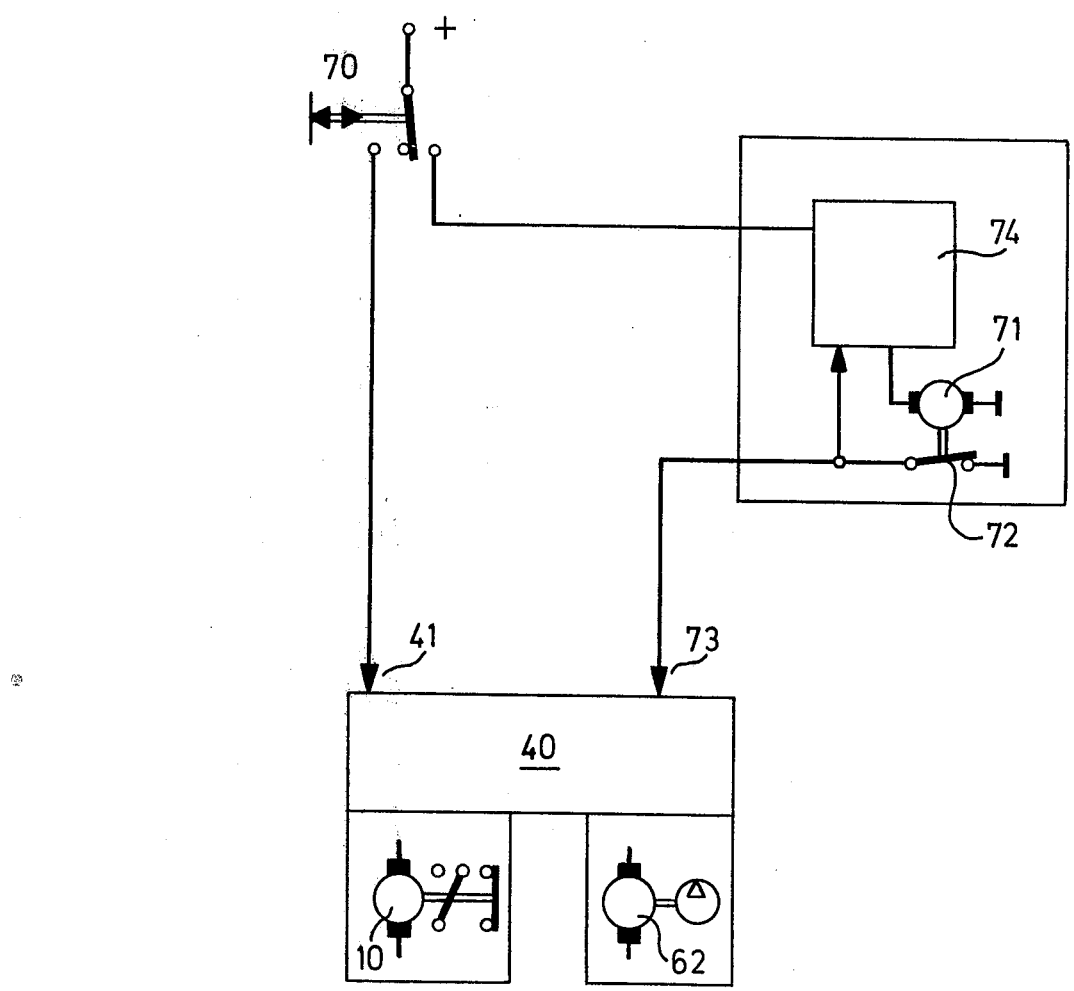
FIG. 3 is a schematic diagram for a windscreen and rear window wiper system and FIG. 4 is a circuit diagram of a further embodiment.

FIG. 3 shows an addition to the version according to FIG. 2, whereby for the sake of simplicity the rear wiper motor 10 and the washing pump motor 62 are only shown schematically. The operating switch 70 has three switching positions. In the left-hand switching position the microcomputer is directly energised. This function corresponds to the operating switch 21. Thereby the rear window wiper installation is energised alone. In the right-hand switching position via the control 74 in usual manner a windscreen wiper installation with the wiper motor 71 is energised to which a conventional limit switch 72 is assigned. The control input 73 of the microcomputer is switched via the limit switch 72. Thus in the right-hand position of the operating switch 70 a first wiper installation is directly energised and in dependence thereon a second wiper installation is energised via the microcomputer. In this manner it can for instance be achieved that the rear window wiper motor is running as long as the windscreen wiper motor or that the rear window wiper motor is started with the windscreen wiper motor, but is running only for a short time or for a predetermined number of wiping cycles or carries out one or more wiping cycles with each wiping cycle of the windscreen wiper motor, whereby also the washing pump is switched on at regular intervals.

Thereby one motor can be synchronised relative to the other by the microcomputer. Of course it is imaginable too to energise several motors, especially all wiper motors of a motor vehicle via the microcomputer with a predetermined timing. Thereby the limit switches of the individual motors the position of which is signaled to the microcomputer other motors are energised in such a way that all motors are brought to a standstill in the one and/or other end position and only start again, when the slowest motor enters the respective end position.

Finally it is pointed out to the fact that the time interval between switching off of the motor and switching it on again can be varied by a regulating element, for instance by the variable resistor 75 in FIG. 2. Thereby in a simple manner a so-called intermittent wiper installation can be realized.

Thereby several alternatives are conceivable. So for instance one can only vary said time interval in the one end position, but keep it constant in the other. Then the motion sequence corresponds to that of known systems. But it is possible to vary the time interval in both end positions, whereby one again distinguishes versions in which the two time intervals are varied independently of each other or via a common regulating element.

Figure 4:
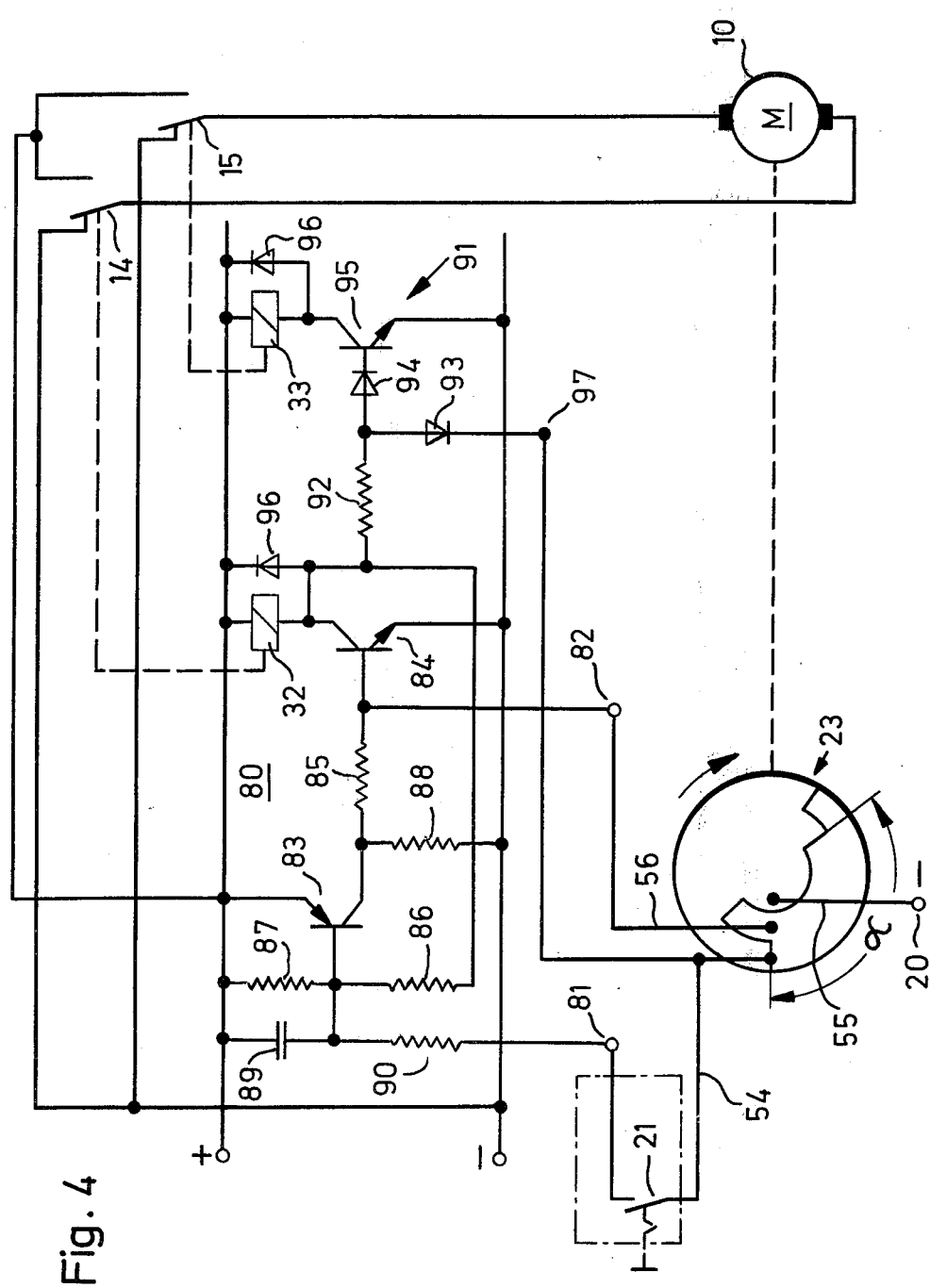

FIG. 4 shows a version with concrete components, which can be built up with very little efforts. A store as a whole designated by 80 has a set input 81 and a reset input 82. The store 80 consists of the two transistors 83 and 84 which are coupled with each other via the resistor 85. The output signal of the transistor 84 is fed back to the input of the transistor 83 via the resistor 86. The resistor 87 serves for the depletion of the base of the transistor 83, the resistor 88 is the load resistor for the transistor 83 and the capacitor 89 serves as an interference suppressor and the resistor 90 as a protective resistor. When the set input 81 is applied to ground potential the transistors 83 and 84 are made conductive. Due to the feedback via the resistor 86 this switching condition is maintained, even if there is no control signal on the set input 81. If later on ground signal is applied to the reset input at first the transistor 84 is blocked and because of the feedback also the transistor 83.

By the output signal of the store on the collector of the transistor 84 one changeover relay 32 is directly energised, but the other changeover relay via the inverting amplifier 91 with the component parts 92, 93, 94 and 95. The diodes 96 serve to protect the transistors 84 and 85. If the control input 97 on the decoupling diode 93 is not wired, thus the two changeover relays are alternatively energised or de-energised.

In the one end position shown (parking position) of the wiper motor the contact spring 54 which via the operating switch 21 is connectable to the set input 81, is applied to earth. The other contact spring 56 is currentless. In the other end position—the wiping angle is designated by α—the contact spring 54 is currentless and the contact spring 56 which is connected to the reset input 82 is switched to earth 20. The contact springs 54 and 56 can be designated as outputs of the limit switch.

In the rest position both changeover relays 32 and 33 are de-energised, for on the control input 97 earth is applied and the transistor 95 is thereby blocked. The transistors 83 and 84 are blocked too, because upon switching on the operating voltage when the capacitor 89 is not charged the base and emitter of the transistor 83 are applied to the same potential. The motor 10 is thereby short-circuited.

If the operating switch 14 is actuated now, earth is switched on the set input 81, thus the store 80 is set and the changeover relay 32 energised. The motor starts in clockwise direction. As soon as the angle α is reached earth is switched to the reset input 82 and the store 80 is reset. The relay 32 releases and the relay 33 attracts. The motor is running with reverse direction of rotation. This process is continuously repeated until the operating switch is switched off. Thus in the parking position it is prevented that the store 80 is set anew. But in the parking position it is simultaneously prevented that the transistor 95 is connected through, because the control input 57 is then applied to earth.

The motor 10 is braked dynamically. In this version the changeover relays 32 and 33 are thus simultaneously switched in particular cases of operation, but by blocking of the output signal of the store 80 via the diode 93 in particular cases an independent control of the relay is provided too. This circuit arrangement distinguishes by a particularly small number of component parts.

What we claim is:

1. In an windshield wiper system having a current-controlled electric motor for driving windshield wipers through repeating wiping cycles by reversing the direction of rotation of the motor through a reversing switch comprising a pair of relays which control the polarity of current applied to the motor, the improvement therewith comprising: a limit switch mechanically coupled to said motor for detecting the end positions of said motor and for providing input signals indicative of said end positions; and, first and second time delay circuits each having an output respectively coupled to one of said relays and each of said delay circuits having a pair of inputs coupled to said limit switch, the first input of each delay circuit being responsive to respective ones of said input signals to activate the output of the delay circuit after a predetermined delay period and the second input of each delay circuit being responsive to respective ones of said input signals to deactivate the output of the delay circuit upon the application of an input signal, with the first input of the first delay circuit and the second input of the second delay circuit being responsive to a first one of said input signals provided by said limit switch when said limit switch detects a first end position of said motor, and with the first input of the second delay circuit and the second input of the first delay circuit being responsive to a second one of said input signals provided by said limit switch when said limit switch detects the other end position of said motor.

* * * * *